United States Patent
Leto et al.

[15] 3,689,832
[45] Sept. 5, 1972

[54] RESISTANCE TESTER FOR PRODUCING AN AUDIBLE TONE THAT VARIES WITH THE RESISTANCE

[72] Inventors: Alfonso Leto, Glendale, Calif. 91205; William R. Davis, Granada Hill, Calif. 91344

[73] Assignee: Western Technical Products, Inc., North Hollywood, Calif.

[22] Filed: May 1, 1970

[21] Appl. No.: 31,849

Related U.S. Application Data

[63] Continuation-in-part of Ser. No. 669,855, Sept. 22, 1967, abandoned.

[52] U.S. Cl.............324/65 R, 324/149, 331/111, 340/384 E
[51] Int. Cl. .............................................G01r 27/02
[58] Field of Search...........324/51, 62, 65, 72.5, 149; 331/111, 129, 143, 113 R; 340/384 E

[56] References Cited

UNITED STATES PATENTS

| | | | |
|---|---|---|---|
| 3,378,693 | 4/1968 | Schmidt | 331/111 X |
| 3,284,707 | 11/1966 | Clinton | 324/62 |
| 3,054,970 | 9/1962 | Lace | 331/111 |
| 3,287,975 | 11/1966 | Mason et al. | 331/111 X |

FOREIGN PATENTS OR APPLICATIONS

| | | | |
|---|---|---|---|
| 1,072,822 | 6/1967 | Great Britain | 324/51 |

*Primary Examiner*—Stanley T. Krawczewicz
*Attorney*—Joseph R. Dwyer and Linval B. Castle

[57] ABSTRACT

An audible resistance and electrical continuity tester in the form of a small self-contained hand tool having a speaker driven by a pulse generator, the frequency of which varies directly with measured resistances from a low audible pitch representing a zero resistance to a high audible pitch representing continuity to a relatively high resistance.

2 Claims, 2 Drawing Figures

PATENTED SEP 5 1972 3,689,832

INVENTORS
ALFONSO LETO
WILLIAM R. DAVIS

BY

ATTORNEY

RESISTANCE TESTER FOR PRODUCING AN AUDIBLE TONE THAT VARIES WITH THE RESISTANCE

This is a continuation of application, Ser. No. 669,855, filed Sept. 22, 1967 which was abandoned on or about July 8, 1970.

In the inspection and checkout or repair of electrical or electronic equipment, the technician is repeatedly required to test the continuity of the circuits and to test for possible malfunctions because of grounded components, etc. In performing this function the technician generally uses a continuity tester such as an ohmmeter and, after the test probes are in position, the technician must take his eyes from the equipment being tested to observe the reading of the meter. In circuits where relatively high currents are not harmful, the technician may use a continuity tester in the form of an indicator light or an electrical buzzer or bell. Such devices are quite satisfactory for use with heavy duty circuits, but are satisfactory only for testing continuity since such devices will not provide an indication of resistance values or will not function if any appreciable resistance is present in the circuit. Audible electronic continuity testers have been developed but have proven to be unsatisfactory because they apply a relatively high voltage and current to the circuit being tested and utilize circuitry in which the tone varies reversely with measured resistance.

The principle object of the present invention is to provide a continuity tester which does not require the technician to remove his eyes from the device being tested, which, by producing a tone that increases in pitch with increased measured resistance, provides the technician with an indication of the approximate resistance contained in the circuit being tested, and which applies very low voltage and currents to the circuit being tested.

Briefly described, the invention comprises a small self-contained hand tool having a speaker which is driven by a resistance sensitive pulse generator. At a zero resistance, or direct continuity, the pulse generator will produce a relatively low frequency audible tone which increases in frequency with a corresponding increase in resistance through the circuit being tested. The circuitry inserts an extremely low current through the circuit under test and is thus not harmful to sensitive and easily damaged components.

In the drawings which illustrate a preferred embodiment of the invention:

Figure 1:
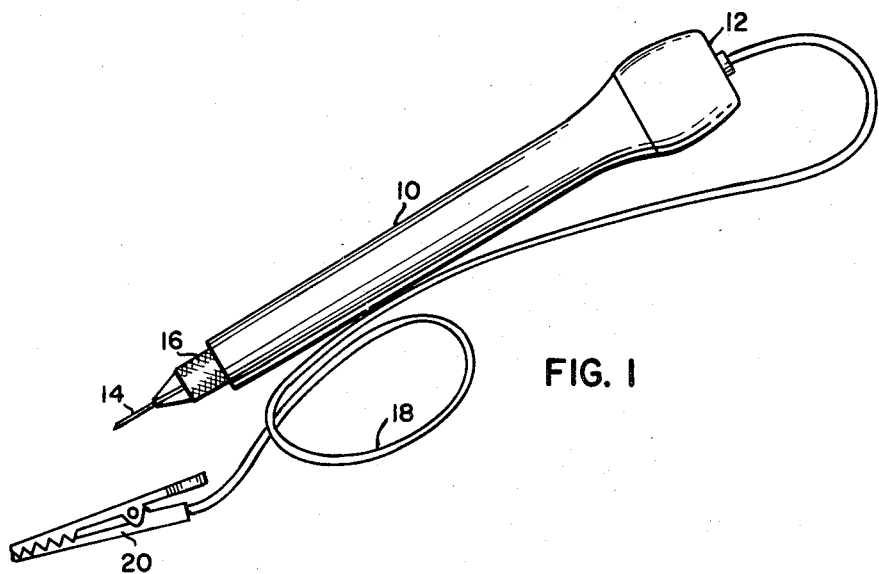
FIG. 1 is an illustration of the audible resistance and continuity tester.

FIG. 1 illustrates the preferred form of the continuity tester which comprises a tubular housing 10 of an electrically nonconductive material, such as plastic, which is larger at one end to accommodate a small circular speaker which is shown covered with a grill 12. Tubular housing 10 may have an outside diameter in the order of five-eighths of an inch, which diameter is determined by the diameter of two small penlight batteries which are contained within housing 10 for operation of the pulse generator also contained therein. Housing 10 may be in the order of 6 inches long and the larger end may have a diameter in the order of 1 inch, which diameter is determined by the diameter of the speaker mounted in the larger end. The opposite end of housing 10 is provided with a probe which comprises a phonograph needle 14 contained in a small pin chuck 16 which is fitted within housing 10. A ground wire 18 of any desired suitable length enters the circuit through the center of grill 12 and is provided, at its other end, with a suitable clip 20.

Figure 2:
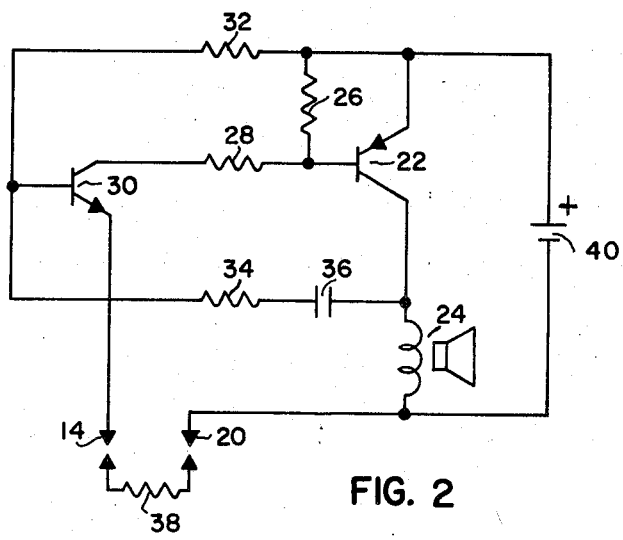
FIG. 2 is a schematic diagram illustrating the circuitry contained in the tester of FIG. 1.

In addition to the two small penlight cells, housing 10 contains a pulse generator, or oscillator, as illustrated in FIG. 2. This oscillator may be considered as comprising two stages, the first of which consists of a PNP transistor 22, having its collector connected to the coil of a speaker 24, the other end of which is connected to the negative terminal of battery 40, the positive terminal of which is connected to the emitter of transistor 22. Speaker 24 is a conventional earphone that has been modified to operate as a speaker with a DC resistance in the order of 30 ohms. Battery 40, as previously indicated, may be comprised of two penlight cells having a total potential of three volts. Connected between the base transistor 22 and the positive terminal of battery 40 is a resistance 26 which may have a resistance of 2.2 kilohms.

The second stage of the pulse generator illustrated in FIG. 2 comprises an NPN transistor 30, the base of which is connected through a resistance 32, which may have a value of 150 Kilohms, to the positive terminal of a 3 volt battery 40, and is also connected through a feedback circuit comprising a resistance 34, which may be 750 ohms, in series with a capacitor 36 having a value of 0.05 microfarad to the collector of transistor 22. The collector of transistor 30 is connected to the base of transistor 22 through a resistance 28 which may have a value of 900 ohms. If transistor 22 is a germanium transistor, resistor 28 may be eliminated. This resistor is desirable only if transistor 22 is a silicon type which inherently has a very low base to emitter resistance. The emitter of transistor 30 is connected directly to probe 14. Clip 20 is connected directly to the negative terminal of battery 40.

OPERATION

With test probes 14 and 20 open, the circuit to the emitter of transistor 30 is open and that transistor is off. Hence, transistor 22 is also off and capacitor 36 is charged. The only current passing through any portion of the circuit will be a very small leakage current, in the order of one or two microamperes, through transistor 22. For this reason, no switch is necessary to disconnect the power from battery 40. When probes 14 and 20 are shorted together or connected across a resistance 38, the circuit to the emitter of transistor 30 is completed and that transistor is biased on. Collector current through transistor 30 will cause transistor 22 to become conductive and capacitor 36 starts to charge to an opposite polarity through resistance 34 and the base-emitter junction of transistor 30. As the charging of capacitor 36 continues, the feedback current reduces and transistor 22 drops out of saturation. Capacitor 36 then starts to apply a reverse voltage to the base of transistor 30 to bias that transistor in the off condition. Transistor 22 then goes to cut off connecting that terminal of capacitor 36 through the speaker 24 to the negative terminal of battery 40 and capacitor 36 discharges through resistances 32 and 34 holding transistor 30 in cut-off. This action continues until capacitor 36 charges to the positive turn-on voltage of the base-emitter junction of transistor 30. Resistance 38 governs the input resistance of transistor 30 and hence the amount of charge that capacitor 36 will take during the positive feedback period. This amount of charge is inversely proportional to the resistance of resistor 38, that is, the larger the value of resistance, the lower the charge and the shorter the time that transistor 30 will be biased off. Speaker 24 thus receives short bursts of current during the positive feedback period and the tone becomes higher as the repetition rate of the pulses increase. It is apparent therefore that as the value of resistance 38 increases, the tone emitted by speaker 24 will increase accordingly.

With the above values applied to the various components of the circuit of FIG. 2, the current through the collector of transistor 30 and the component under test will be less than 1 milliampere and the applied voltage will be less than 3 volts. The tester is thus valuable for testing circuits containing sensitive or easily damaged components.

In the circuit described, test probes 14 and 20 are inserted into the circuit at a point where the effective input resistance to transistor 30 would be equal to the resistance 38 times the beta value of transistor 30. Hence, small changes in resistance values of resistance 38 will produce a clearly audible change in pitch through speaker 24. With the values given, there will be a clearly audible variation of frequency when resistance 38 varies between zero, or a short circuit, and approximately 1,000 ohms. Above this limit, an audible sound will be produced, but there will be no audible distinction in the frequency pitch. The tester is therefore extremely useful for testing for continuity in low resistance circuits. It is apparent that modifications of component value may be made without departing from the spirit of the invention.

We claim:

1. An audible, resistance and electrical continuity tester for generating an audible tone where frequency varies directly in accordance with the resistance of the component under test —high resistance, high frequency and low resistance, low frequency — and having a speaker, a first test probe terminal, a second test probe terminal, said tester including an audio-frequency oscillator comprising a first circuit including a first transistor in series with said speaker, said first circuit being coupled across first and second terminals of a dc source, a second circuit including a second transistor having its collector coupled to the base of said first transistor for controlling said first circuit, the base of said second transistor being coupled to the emitter of said first transistor and the first terminal of the dc source, the emitter of said second transistor being coupled to said first test probe terminal, said second test probe terminal being coupled to the second terminal of said dc source, and a series RC circuit coupled between the base of said second transistor and the collector of said first transistor for producing oscillation at a frequency controlled by and directly related to the resistance of a component under test across said first and second test probe terminals, which resistance completes the circuit from said second transistor to the dc source so that if, and only if, the resistance under test completes said circuit, will current be drained from said dc source eliminating all need for switches in the oscillator.

2. The continuity tester as claimed in claim 1 further including an elongated tubular housing with said first test probe mounted on said tubular housing, and said speaker and audio-frequency oscillator mounted within said housing so as to form a self contained hand-held testing device.

* * * * *